(12) United States Patent
De Vreede

(10) Patent No.: US 11,064,093 B2
(45) Date of Patent: Jul. 13, 2021

(54) PROCESSES FOR PRINTING SPOT COLORS

(71) Applicant: Avery Dennison Corporation, Glendale, CA (US)

(72) Inventor: Bart De Vreede, Hazerswoude-Rijndijk (NL)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 16/207,491

(22) Filed: Dec. 3, 2018

(65) Prior Publication Data

US 2019/0176478 A1 Jun. 13, 2019

Related U.S. Application Data

(60) Provisional application No. 62/595,771, filed on Dec. 7, 2017.

(51) Int. Cl.
| | |
|---|---|
| *B41J 2/205* | (2006.01) |
| *B41J 2/21* | (2006.01) |
| *H04N 1/54* | (2006.01) |
| *H04N 1/60* | (2006.01) |
| *H04N 1/62* | (2006.01) |

(52) U.S. Cl.
CPC ............... *H04N 1/60* (2013.01); *B41J 2/205* (2013.01); *B41J 2/211* (2013.01); *B41J 2/2103* (2013.01); *B41J 2/2107* (2013.01); *H04N 1/54* (2013.01); *H04N 1/6027* (2013.01); *H04N 1/6072* (2013.01); *H04N 1/628* (2013.01)

(58) Field of Classification Search
CPC ... B41J 2/205; B41J 2/21; B41J 2/2103; B41J 2/2107; B41J 2/11; H04N 1/54; H04N 1/6072; H04N 1/6027
See application file for complete search history.

(56) References Cited

U.S. PATENT DOCUMENTS

| | | | |
|---|---|---|---|
| 6,637,860 B1 | 10/2003 | Madeley | |
| 6,717,699 B1 | 4/2004 | Janssen et al. | |
| 7,004,562 B2 | 2/2006 | Madeley | |
| 7,032,517 B2 | 4/2006 | Bestmann | |
| 8,955,940 B1 | 2/2015 | Smith et al. | |
| 2003/0090532 A1* | 5/2003 | Piatt | H04N 1/407 347/5 |
| 2004/0223172 A1* | 11/2004 | Yoshizawa | H04N 1/6033 358/1.8 |
| 2005/0179727 A1 | 8/2005 | Bestmann | |
| 2012/0090488 A1* | 4/2012 | Postle | H04N 1/54 101/483 |
| 2015/0158317 A1 | 6/2015 | Sirnoni et al. | |
| 2015/0184008 A1* | 7/2015 | Mori | C08K 5/3417 347/20 |
| 2015/0339552 A1 | 11/2015 | Deshpande | |
| 2017/0266981 A1 | 9/2017 | Chang et al. | |

OTHER PUBLICATIONS

International Search Report dated Mar. 7, 2019 issued in corresponding IA No. PCT/US2018/063565 filed Dec. 3, 2018.

* cited by examiner

*Primary Examiner* — Matthew Luu
*Assistant Examiner* — Kendrick X Liu

(57) ABSTRACT

The present disclosure relates to a process for printing comprising the steps of selecting eight or fewer process colors from a known process ink color set, providing a color channel for the selected process colors from the known process ink color set, providing two or more spot color channels, wherein one or more of spot colors correspond to a non-selected process color of the process ink color set, applying a first ink limit and a first linearization to the one or more spot color channels to produce a color set including the non-selected process color of the known process ink color set, applying a second ink limit and a second linearization to the one or more spot color channels to produce a color set including the spot color, and optionally printing an image.

9 Claims, No Drawings

PROCESSES FOR PRINTING SPOT COLORS

CROSS-REFERENCE TO RELATED APPLICATION

The present application claims the benefit of U.S. Provisional Patent Application No. 62/595,771 filed on Dec. 7, 2017, which is incorporated by reference in its entirety.

FIELD OF THE INVENTION

The present disclosure relates to processes for printing spot colors. More specifically, the present disclosure relates to processes for printing that employ two or more ink limits and two or more linearizations to a single spot color channel to allow a spot color to function as both a spot color and a process color corresponding to the applied ink limit and applied linearization. The present disclosure further relates to an ink jet printer that utilizes a specific ratio of spot color channels to process color channels according to the processes described herein.

BACKGROUND

Ink jet printing systems are widely used in many different fields to produce printed images on a variety of substrates. Conventional color ink jet printers utilize basic process ink color sets, usually comprising from four to eight process colors, to form the color variations required to print the desired image. One of the well-known process ink color sets comprises four basic colors: cyan, yellow, magenta, and black, and is referred to as the CMYK color set or the CMYK process color method. Generally, the process colors in a process color set are used to produce a range of printed colors by combining various amounts of each of the process colors. Typically, in an ink jet printer, the CMYK colors are not actually blended together to form the desired color. Rather, very small drops of ink of different colors are deposited next to each other on the page. From a slight distance, the human eye tends to blend the individual ink drops together to form an area of the "mixed" color. The range of possible colors that can be printed by a printing process is referred to as the color "gamut" of the process.

Using these techniques, color ink jet printers are generally able to reproduce a sufficient number of colors. In an effort to expand the gamut of the CMYK color set, other process inks have been added, thus creating other process color sets/methods, e.g., CMYKRGB and CMYKOG. Unfortunately, the gamuts of most of these color sets are much smaller than the total range of colors that can be seen by the human eye. In some instances, the gamuts of process color printers are smaller than the gamuts produced by traditional printing presses, such as offset, flexographic, gravure and screen printing presses. For example, flesh tone colors are not easily created using the CMYK color method, nor are fluorescent and metallic colors.

Also, many specialized colors cannot be easily formed via conventional process ink color sets. Some specialized colors are referred to as "spot colors" (also as "house colors" or "brand colors"). These spot colors are customer-specific multi-pigmented colors, often associated with a specific company, product, and/or brand name. Spot colors are generally formed at the molecular level and are made up by blending a variety of tints, hues and shades of colors. Examples include the precise hues of red and yellow used by Kodak®, IBM® Blue or Coca-Cola® Red. Conventional ink color sets are usually unable to reproduce spot color vividness. This inability to reproduce spot colors may occur because in conventional process printing, every color is made up of overlapping process ink dots, as opposed to spot color printing, which involves application of solid areas of the pre-mixed spot colors. When CMYK ink jet printers try to achieve some of these specialized colors, processing problems ensue. In addition, there are often slight variations in the CMYK ink lots, so even if a specialized color of ink is achievable at one time, it may not be achievable at a later time if ink of a different lot is used. Thus, the color gamuts provided by conventional ink color sets leaves much room for improvement.

In addition to color gamut deficiency, conventional ink color sets/processes yield printed images that are insufficient for various applications. For example, problems are known to exist with the durability of process ink images. Specifically, for applications relating to large format signage, e.g., outdoor signage such as traffic signs, printed images produced from conventional ink color sets are known to fade over time, to decrease in reflectivity, to vary between nighttime and daytime color, and/or to demonstrate other decreases in visual quality, e.g., sharpness of color and color contrast. These parameters are particularly germane to traffic signage because of the strict regulations relating thereto. Also, conventional images are known to have problems with consistency, e.g., banding and other types of color variations. In some cases, these types of defects are difficult to initially recognize due to the composition of the process color inks that are employed.

Further, conventional printers may include several process color channels and a limited number of spot color channels (as compared to the number of process color channels). If an additional spot color is needed (as is often the case), one or more of the spot color channels must be flushed with cleaning solvents (often referred to as the "longstore process") and replaced with the new spot color. The longstore process is time consuming and generates waste of inks and cleaning solvents. Further, the increased use of cleaning solvents has a significant negative effect on printer life.

U.S. Patent Application Publication No. 2012/0090488 discloses that spot colors reproduce high value brand colors to supplement conventional process colors for printed images and packaging. This publication also discloses that a printing press can utilize hi-fidelity process inks (with at least three unique colors and black) and spot colors for printing solid brand colors and for printing over other colors to produce wide-gamut, half-toned color reproductions. Other references also relate to expansion of color gamuts of conventional ink color sets and processes, many of which add process inks to the existing color set and some of which use process colors in attempts to simulate spot colors. Some references that disclose expanding color gamuts in such a way include U.S. Pat. Nos. 6,717,699; 7,004,562; 7,032,517; 8,955,940; and US Patent Application Publication Nos. 2015/0158317 and 2015/0339552. These publications, however, focus exclusively on problems related to expansion of the gamut of conventional ink color sets.

U.S. Patent Application Publication No. 2017/0266981 discloses a color set of process colors and spot colors that utilize more spot colors than conventional printers to expand the color gamut. The publication also discloses that substitution of spot colors for process colors allows for more spot colors to be used in a color set, which reduces/eliminates the need for the longstore process. The publication further discloses a process for producing a printed image on a substrate (or producing a color set), comprising: selecting eight or fewer process colors from a known process ink color set; providing two or more spot colors, forming a color set comprising the process colors and the spot colors wherein the ratio of the number of spot colors to the number of process colors is at least 0.5:1; and optionally printing the image using the formed color set. This publication, however, focuses on gamut expansion, durability, consistency, control, printer life, etc., and makes no mention of applying two or more ink limits and linearizations to a spot color channel to operate as a spot color or a process color.

In the above-mentioned conventional processes, ink jet printer systems typically include a driver that provides one ink limit and one linearization for each color channel to control the amount of ink dispensed from a print head onto a media. When printing directly from an ink jet printer, normally a user selects the media type and the print quality and/or resolution before printing. By selecting the media type, the driver of the ink jet printer uses a pre-set ink limit and linearization for the specific media at the selected print quality and/or resolution. In some instances, the ink jet printers are driven by dedicated raster image processing solution which gives the end user the ability to create custom ink limits and linearizations. However, these ink jet printing processes still limit the color channel to one link limit and one linearization for the chosen settings.

A need exists for improved printing processes that allow the use of additional spot colors to provide the improvements in printed image durability, printed image consistency, control, and printer lifetime (longstore process reduction/elimination) in addition to significant color gamut expansion.

SUMMARY OF THE INVENTION

In one embodiment, the invention relates to a process for printing. The process comprises the steps of selecting eight or fewer process colors from a known process ink color set; providing eight or fewer color channels comprising the selected process colors from the known process ink color set; providing two or more color channels comprising spot colors, wherein one or more of the spot colors correspond to a non-selected process color of the known process ink color set, applying two or more ink limits to each color channel comprising the one or more spot colors, applying two or more linearizations to each color channel comprising the one or more spot colors, and optionally printing an image. In some cases, the one or more spot colors are configured to operate as the spot color and the non-selected process color of the known process ink color set according to the applied ink limit and the applied linearization. In some embodiments, a first ink limit corresponds to the non-selected process color of the known process ink color set and a second ink limit corresponds to the spot color. Similarly, a first linearization corresponds to the non-selected process color of the known process ink color set and a second linearization corresponds to the spot color. In some cases, a first ink limit and a first linearization are applied to each color channel for the one or more spot colors to produce a color set including the non-selected process color of the known process ink color set. In some cases, a second ink limit and a second linearization are applied to each color channel comprising the one or more spot colors to produce a color set including the spot color. The ratio of the number of color channels for the spot colors to the number of color channels for the process colors is at least 0.5:1. In some embodiments, the provided channels for the spot colors comprise an additional spot color channel. The additional spot color channel does not correspond to one of the non-selected process colors of the known process ink color set. In some cases, at least two spot colors correspond to at least two non-selected process colors of the known process ink color set. The at least two spot colors may be spot yellow and spot black. In some embodiments, one or more ink limits and one or more linearizations are applied to the color channels comprising the selected process colors.

In another embodiment, the invention relates to a process for printing an image. The process comprises the steps of identifying a known process ink color set comprising at least four colors, selecting two or more process colors from the known process ink color set, substituting each of the selected process colors with a spot color corresponding to the selected process color from the known process ink color set, providing a color channel for each unselected process color and each spot color, determining if the spot color is operating as the selected process color or the spot color, and printing an image on a substrate. The color channel for the spot color cab be applied with a first ink limit and a first linearization corresponding to the selected process color. The color channel for the spot color can be applied with a second ink limit and a second linearization corresponding to the spot color. The color channel for the spot color is configured to operate as the selected process color when the first ink limit and the first linearization are applied. The color channel for the spot color is configured to operate as the spot color when the second ink limit and the second linearization are applied. In some embodiments, an ink limit and a linearization to the channels comprising the unselected process colors. The ratio of a number of substituted spot color channels to a number of process color channels is at least 0.5:1. In some embodiments, the process may further comprise providing one or more color channels for additional spot colors. The additional spot colors do not substitute process colors from the known process ink color set. In some cases, the printing step comprises printing the image using at least one unselected process color and at least one spot color.

In yet another embodiment, the invention relates to a process for printing an image from an ink jet printer. The process comprises the steps of providing one or more color channels comprising process colors selected from a known process ink color set, providing one or more color channels comprising spot colors wherein one or more of the spot colors correspond to a non-selected process color of the known process ink color set, applying one or more ink limits to the one or more spot color channels, applying one or more linearizations to the one more spot color channels, and printing an image to a substrate. The ratio of the number of channels comprising spot colors to the number of channels comprising process colors is at least 1:1. In some cases, a first ink limit and a first linearization are applied to the one or more spot color channels to produce a non-selected process color from the known process ink color set. In other aspects, a second ink limit and a second linearization are applied to the one or more spot color channels to produce a spot color. In some cases, the printer comprises at least three color channels and two or fewer of the channels comprise process colors. In other cases, the printer comprises at least six channels wherein three or fewer of the channels comprise a process color and two or more of the channels comprise spot colors. In some embodiments, the process further comprises applying one or more ink limits and one or more linearizations to the color channels comprising the selected process colors. In some embodiments, the process further comprises providing one or more additional spot color channels, wherein the additional spot color channels do not correspond to one of the non-selected process colors of the known process ink color set.

DETAILED DESCRIPTION OF THE INVENTION

Introduction

In some embodiments, the present invention relates to a unique printing process that applies two or more ink limits and two or more linearizations to a spot color channel. The process enables a spot color to function as both a spot color and a process color corresponding to the applied ink limit and the applied linearization. The process allows an ink jet printer to utilize an increased number of spot color channels compared to process color channels since the spot color can replace the process color from a known process ink color set. In some cases, a known process ink color set can have an increased number of spot colors which substitute or replace process colors in the known process ink color set. The increased use of spot colors in the known ink color set surprisingly and unexpectedly provides for a multitude of beneficial performance improvements when utilized in ink jet printing processes. While some conventional printing processes utilize a process that applies a single ink limit and a single linearization to each color channel, these conventional processes fail to achieve the aforementioned combination of advantageous improvements.

The present invention also provides for increased printer spot color printing capability, e.g., the ability to utilize more spot color channels than conventional printers, for example more than two spot color channels, more than three spot color channels, more than four spot color channels, more than five spot color channels, or more than six spot color channels. In certain instances, spot color channels can entirely replace one or more process colors in a known process ink color set. Some of the benefits of the present invention include improvements in printed image (weather) durability, printed image consistency, and printer lifetime, in addition to significant color gamut expansion.

Ink Color Sets, Ink Color Channels, and Printing Processes

It has now been discovered that printing processes that apply two or more ink limits and two or more linearizations to a spot color channel allow for the use of inventive ink color sets comprising an increased number of spot colors (in an ink jet printing process). For example, by applying two ink limits and two linearizations to a spot color channel, the spot color can be selectively used as a spot color or a process color depending the applied ink limit and linearization. In addition to color gamut expansion, this has a beneficial effect on the properties of the resultant printed image, e.g., durability. As described above, problems are known to exist with the durability of process ink images. Conventional printed images have been known to fade over time, to decrease in reflectivity, to vary between nighttime and daytime color, and/or to demonstrate other decreases in visual quality, e.g., sharpness of color and color contrast. The inventive printing process solves these problems.

By applying two ink limits and two linearizations to a spot color channel, the spot color can be employed as both a spot color and a process color. In some aspects, applying a first ink limit and a first linearization to the spot color channel produces a process color from a known process color ink set. In other aspects, applying a second ink limit and a second linearization to the spot color channel produces a spot color. This enables an ink jet printer to employ more spot color channels to improve a known process ink color set. That is, using the inventive process, the spot color channel can entirely replace a process color channel in a known process ink color set. For example, the ratio of spot colors to process colors, as well as their respective color channels, is at least 0.5:1. Optionally, the number of spot colors is greater than or equal to the number of process colors. By using an increased number of spot colors, a highly durable image may be produced. This type of highly durable image may be particularly advantageous, for example, when employed in applications relating to large format signage, e.g., outdoor signage such as traffic signs. As described above, durability is particularly germane to traffic signage because of the strict regulations relating thereto. Without being bound by theory, it is believed that the use of greater amounts of spot colors and the actual composition of the spot colors contribute to the improvements in the performance characteristics of the image. For example, spot colors may contain higher stability pigments and/or UV stabilizers (as compared to the pigments of process colors), which may contribute to the improvements in performance characteristics of the image.

In addition to the durability benefits, the ink color sets produced by the inventive printing process provide for unexpected improvements in printed image consistency. Conventional images, e.g., those printed using process ink color sets such as CMYK, suffer from defects such as banding and other types of color variations. In some cases, these types of defects are difficult to initially recognize due to the printing process (overlay of process ink spots) and/or the actual composition of the process color inks that are employed. However, when the ink color sets, ink color channel configurations, and processes are utilized, defects, e.g., banding and other types of color variation, are much more easily recognized. Without being bound by theory, because more of the spot colors are directly printed as a solid color, e.g., not overlaid, defects may be more recognizable. Because of this improved recognition, consistency and quality control of printed images are advantageously improved.

Also, the inventors have found that, because of the properties of the spot colors and the improved ease of making opacity adjustments, the use of the inventive ink color sets provides for better image control. In some cases, the high amount of spot colors in the inventive ink color sets may be printed simply by setting the opacity (coverage) percentage to give a (single) solid color print. In contrast, conventional process color sets often rely on the preset profiles, which must be calibrated on each specific substrate sheet. These advantageous combinations of image performance characteristics achieved by the present ink color sets and processes could not have been predicted.

By employing spot color channel and process color channel configurations as discussed herein, the inventive ink color sets and processes lead to surprising improvements in printer life and overall process efficiency, e.g., reduced ink waste and/or cleaning solvent waste. This benefit is especially relevant in instances where greater numbers of spot colors are required to print the image. In these cases, the substitution of spot colors for process colors allows for more spot color channels to be used in a color set, which reduces/eliminates the need for the longstore process and provides for an additional benefit of improved printer life. As noted above, conventional printing processes fail to recognize the effects of spot colors or the combination of spot colors and process colors on the resultant image.

Accordingly, in one embodiment, the present invention relates to a process for printing. The process includes the step of selecting eight or fewer process colors from a known process ink color set, providing eight or fewer color channels comprising the selected process colors. The process also includes the step of providing two or more color channels comprising spot colors wherein one or more of the spot colors correspond to a non-selected process color of the known process ink color set. Next, the process includes the step of applying two or more ink limits to the color channel comprising the one or more spot colors and applying two or more linearizations to the color channel comprising the one or more spot colors. In other words, the spot color channel can be applied with a first ink limit and a first linearization corresponding to the non-selected process color, or the spot color channel can be applied with a second ink limit and a second linearization corresponding to the spot color. Finally, an image may be printed.

In some embodiments, the one or more spot colors channels is configured to operate as the spot color or the non-selected process color of the known process ink color set according to the applied ink limit and applied linearization to the color channel. In one aspect, the process can apply a first ink limit to the spot color channel corresponding to the non-selected process color of the known process ink color set and a second ink limit corresponding to the spot color. In another aspect, the process can apply a first linearization to the spot color channel corresponding to the non-selected process color of the known process ink color set and a second linearization corresponding to the spot color. In some aspects, applying the first ink limit and the first linearization to the spot color channel produces a color set or image including the non-selected process color of the known process ink color set. In other aspects, applying the second ink limit and the second linearization to the spot color channel produces a color set or image including the spot color.

In another embodiment, the process for printing an image includes identifying a known process ink color set comprising at least four colors, selecting two or more process colors from the known process ink color set, and substituting each of the selected process colors with a spot color corresponding to the selected process color from the known process ink color set. The process then includes a step for providing a color channel for each unselected process color and each spot color and determining if the spot color is operating as the selected process color or the spot color. An image may then be printed on a substrate. Based on the determination step, e.g., via the driver, the color channel for the spot color can be applied with a first ink limit corresponding to the selected process color or a second ink limit corresponding to the spot color. Similarly, the color channel for the spot color can be applied with a first linearization corresponding to the selected process color or a second linearization corresponding to the spot color. In some cases, the color channel for the spot color can be applied with different ink limits and different linearizations during the same process for printing an image to produce the spot color or the selected process color.

In some aspects, the driver of the ink jet printer is capable of recognizing a spot color that replaces or substitutes the process color in a known process ink color set, or if the spot color is an additional color that does not replace a process color. If the spot color replaces a process color, the driver can apply two or more sets of ink limits and corresponding linearizations to the spot color channel to produce the desired color set. For example, the driver applies a first ink limit and a first linearization to the spot color channel to operate as the selected process color. Alternatively, the driver applies a second ink limit and a second linearization to the spot color channel to operate as the spot color. The driver can also apple one or more ink limits and one or more linearizations to the channel(s) comprising the unselected process color(s).

Generally speaking (and in the embodiments discussed herein), the ratio of the number of spot colors to the number of process colors, and their respective color channels, may be 0.5:1 or greater, e.g., 1:1, 1.5:1, 2:1, 2.5:1, 3:1, 4:1, 5:1, 6:1, 7:1, 8:1, 9:1 or 10:1. In some cases, the number of spot colors in the formed color set may be greater than (or optionally equal to) the number of process colors. These limits and ranges are applicable to the color sets/processes discussed herein. Once the desired ratio is determined, each of spot colors and/or process colors may occupy a single color channel. In some cases, spot colors may occupy three or more channels of an eight channel printer, e.g., four or more, five or more, or six or more. In some embodiments, the spot color channels can entirely replace the process color channels for a known process ink color set. This feature is a highly desired feature for traffic signage industry since more spot colors could be printed without the need to physically increase the ink channels.

The known process ink color set provided in the color channels may vary widely. The known process ink color set comprises any number of known process colors, e.g., one or more, two or more, three or more, or four or more. Many process ink color sets are and have been in use for some time. Examples include the CMYK, CMYKOG, CMYKRGB, and CcMmYK color sets (where "c" and "m" refer to lighter shades of cyan and magenta, respectively). This listing is by no means limiting. Broadly speaking, the known process ink color set may be any color set that comprises a known process color. In one embodiment, the known process ink color set does not comprise any spot colors. In one embodiment, the known ink color set is the CMYK color set.

The ink jet printers comprise, among other components, a plurality of color channels, e.g., at least three channels, at least four channels, at least five channels, at least six channels, at least seven channels, at least eight channels, at least nine channels, or at least ten channels. Each of the channels comprises or is associated with a respective ink or ink color, i.e., a spot color or a process color from a known ink color set. The channels may hold or contain the respective inks, which are used to create the images.

In some embodiments, the process colors from a known ink color set are provided in six or fewer channels, e.g., five or fewer, four or fewer, three or fewer, or two or fewer. In preferred embodiments, the process colors are provided four, three or two of the channels. In some embodiments, the spot colors are provided in two or more of the channels, e.g., three or more, four or more, five or more, six or more, seven of more, eight or more, nine or more, or ten or more. The number of channels that contain spot colors (and thus the number of spot colors used by the printer(s)) may be greater than the number of channels that contain process colors (and thus the number of process colors used by the printer(s)). In addition to the color channels, the inventive printers may further comprise other well-known printer componentry, e.g., drivers, cartridge adapters, dryers, etc.

In some instances, the ratio of channels comprising spot colors to the channels comprising process colors is as described herein with respect to the number of spot colors and process colors. By utilizing a greater number of spot color channels, the inventive printers lead to surprising improvements in printer life and overall process efficiency. For instance, in many applications, a greater number of spot colors are required to print an image. Because the inventive printers utilize a greater amount of spot color channels, the need to change out the channels, e.g., to remove one spot color and replace it with another, is minimized or eliminated. Accordingly, waste of ink and cleaning solvents that is required for channel change outs (the long store process) is also minimized or eliminated. Further, because use of the aggressive cleaning solvents may be reduced, there is an accompanying benefit in printer life.

The present process advantageously uses a greater number of spot color channels (compared to conventional processes), preferably, greater amounts of spot color channels as compared to process color channels. For example, the ratio of the number of spot color channels to the number of process color channels may be as discussed above. Many combinations of spot color channels and process color channels are contemplated as long as the ratio of the number of spot color channels to the number of process color channels is at least 0.5:1, e.g., greater than 0.5:1. For example, the formed color set may comprise two spot colors and one process color; three spot colors and one process color; three spot colors and two process colors; four spot colors and one, two, or three process colors; five spot colors and one, two, three, or four process colors; or six spot colors and one, two, three, four, or five process colors. Preferably, the formed color set comprises five spot colors and three process colors or six spot colors and two process colors. In each of these formed color sets, a color channel is provided for each of the respective process colors and spot colors.

As described above, in some embodiments the spot color(s) correspond to one of the non-selected process colors of the known process ink color set. Thus, the spot color(s) substitute one or more of the colors that were originally in the known process color ink set, e.g., the spot color takes the place of the respective process color, as opposed to the mere addition of a spot color to a known process ink color set (wherein both the spot color and the corresponding process color exist in the color set). In this way, more spot color channels can be utilized in an ink jet printer.

In the inventive processes, the spot color channels are employed as both spot colors and as process colors according to the applied ink limits and linearizations. In preferred embodiments, during printing operations, at least some of the spot color channels serve as both the respective spot color and as the process color that was substituted (by the spot color). The respective spot color may be used where the related process color would have been previously used. For example, if the known process ink color set is the CMYK color set, the Y and/or K color channels may be replaced by spot yellow and/or spot black color channels. And, during printing operations, the spot yellow color channel is used as both spot yellow and process color Y and the spot black color channel is used as both spot black and process color K. The inventors have found that by substituting several spot colors for the corresponding process colors, the color gamut can be advantageously expanded.

In some embodiments, the ink color set further comprises one or more additional spot color channels in addition to the spot color(s) that correspond to one of the non-selected colors of the known process ink color set. The additional spot color channel(s) do not correspond to one of the non-selected process colors of the known process ink color set. In other words, the additional spot color channel(s) may not be configured to serve as both a spot color and a process color. However, it is also contemplated that the additional spot color channel(s) may, in some instances, be configured to receive one or more ink limits and one or more linearizations to operate as the spot color or another color.

In another embodiment, the process of printing an image includes identifying a known process ink color set comprising at least four colors, selecting two or more process colors from the known process ink color set, substituting each of the selected process colors with a spot color corresponding to the selected process color from the known process ink color set, providing a color channel for each unselected process color and each spot color, determining if the spot color is operating as the selected process color or the spot color, and printing an image on a substrate. The color channel for the spot color is applied with a first ink limit and a first linearization corresponding to the selected process color and a second ink limit and a second linearization corresponding to the spot color.

In embodiments where one or more spot color(s) substitute one or more of the process colors that were originally in the known process color ink set, a unique process for printing is utilized. The process employs a driver that provides one or more ink limits and one or more linearizations to the color channel(s) including the one or more spot color(s). The spot color channel functions as a spot color or the substituted process color according to the applied ink limit and linearization. In some cases, the substitution comprises the step of identifying one or more process colors that were selected for substitution and determining a substitute spot color corresponding thereto. The selected process colors are then substituted with the substitute spot color, e.g., the substitute spot color(s) take the place of the selected process color(s), thus forming the improved ink color set (as discussed herein).

It is noted that transparency may be an issue in using a spot color as a process color. Generally, brand color inks are not tested as critically for transparency since they are not used in a process set. Process inks typically must be transparent to show the color underneath to form the 2-color overprint. Thus, in exemplary embodiments of the present invention, where a spot color is substituted for a process color, the spot color ink may be made to be sufficiently transparent so as to facilitate its use for overprinting.

In one embodiment, the color channels for the spot colors of the ink color set comprise at least one channel for spot yellow and one channel for spot black (spot yellow and/or spot black). The inventors have surprisingly found that the inclusion of spot yellow and/or spot black to the ink color set provides for significant expansion of the color gamut. Without being bound by theory, it is believed that spot black colors have more depth of color and that this depth of color combines particularly well with spot yellow and with other process colors.

In some cases, the inventive printing processes utilize a driver that is responsible for recognizing the colors of a color set and facilitating the printing operation. Preferably, the driver is capable of recognizing each spot color as a corresponding member of the known process ink color set, and differentiating each spot color from the respective corresponding member of the known process ink color set. In some cases, the driver is configured to employ the spot colors as both process colors and spot colors according the applied ink limit and applied linearization. The driver has the capability of employing the spot color as a substitute for a particular process color that is listed in a design file. In other words, the driver is capable of employing two or more ink limits and two or more linearizations to a spot color channel to enable the spot color operate as a process color or a spot color depending on the applied ink limit and linearization. If the driver determines that a color set requires the spot color to operate as a process color, the driver applies a first ink limit and a first linearization to the spot color channel corresponding to the non-selected process color of the ink color set. Similarly, if the driver determines that the color set requires the spot color operate as the spot color, the driver applies a second ink limit and a second linearization corresponding to the spot color.

In other embodiments, some of the spot colors channels may simply add to the color set. For example, the spot colors may be present along with the corresponding member of the process ink set. For example, an ink color set may comprise process color C (cyan) along with color channels for spot blue and spot red. In such an ink color set, the spot blue color is related to the C process color. In other cases, some of the spot colors may not have a relationship to any of the process colors in the process ink set. For example, an ink color set may comprise process colors C and M (magenta) along with spot black, spot yellow, and spot white. In such an ink color set, the spot colors are not directly related to the C and M process colors.

In some embodiments, especially with regard to the traffic signage printing, the use of the printing process provides for the use of more spot colors in a printer. In traffic signage printing, there are at least four other (primary) spot colors including green (or Worboy green), red, blue and brown in traffic signage industry. The number of ink channels in printers is often limited, e.g., less than ten channels. Thus, it is often a challenge to print all of the major spot colors along with process colors, e.g., CMYK, for printers with less than ten ink channels. By substitution of some process ink channels, the spot color printing capability could be significantly improved as discussed herein.

In some embodiments, a stable printing system, using well-known printing processes may be provided where spot colors may be printed as solids for logos and brand names, in tone scales for vignettes, and to provide high fidelity color images (with process colors). In some of these embodiments, changes in a given print job will only require changing those print stations that have different spot colors contained in the next print job.

In one embodiment, the inventive printers do not comprise a sub-tank. A sub-tank is a container that is generally known to function as a reservoir to store a quantity of ink (in addition to the ink stored in the cartridge). Typically, each channel has a sub-tank associated therewith. In some cases, the sub-tank(s) allows the printer to continue to print images when one or more channels are low on the respective ink cartridge. The printer can be configured to send an alarm when the respective channel is low on the respective ink. The sub-tank may allow the printer to continue to print while one or more of the channels is low on ink. The sub-tank(s), however, require a significant amount of space in the printer assembly. In addition, the sub-tank(s) increase waste during the longstore process, due to, inter alia, ink loss. Because the inventive printers effectively utilize spot colors as described, the long store process is reduced or eliminated and, beneficially, the increased waste associated with the sub-tank(s) can be avoided.

Printing Processes

The mechanics of the printing steps employed by the inventive processes may vary widely. The art is replete with teachings relating to the printing process itself. Examples include U.S. Pat. No. 6,637,860, the entire contents of which are hereby incorporated by reference.

The following embodiments are contemplated. All combinations of features and embodiments are contemplated.

Embodiment 1: A process for printing comprising: selecting eight or fewer process colors from a known process ink color set; providing eight or fewer color channels comprising the selected process colors from the known process ink color set; providing two or more color channels comprising spot colors, wherein one or more of the spot colors correspond to a non-selected process color of the known process ink color set; applying two or more ink limits to each color channel comprising the one or more spot colors; applying two or more linearizations to each color channel comprising the one or more spot colors; and optionally printing an image.

Embodiment 2: An embodiment of embodiment 1, wherein each color channel comprising the one or more spot colors is configured to operate as the spot color and the non-selected process color of the known process ink color set according to the applied ink limit and the applied linearization.

Embodiment 3: An embodiment of embodiments 1 and 2, wherein a first ink limit corresponds to the non-selected process color of the known process ink color set and a second ink limit corresponds to the spot color.

Embodiment 4: An embodiment of any one of embodiments 1-3, wherein a first linearization corresponds to the non-selected process color of the known process ink color set and a second linearization corresponds to the spot color.

Embodiment 5: An embodiment of any one of embodiments 3-4, wherein a first ink limit and a first linearization are applied to each color channel comprising the one or more spot colors to produce a color set including the non-selected process color of the known process ink color set.

Embodiment 6: An embodiment of any one of embodiments 3-4, wherein a second ink limit and a second linearization are applied to each color channel comprising the one or more spot colors to produce a color set including the spot color.

Embodiment 7: An embodiment of any one of embodiments 1-6, wherein a ratio of a number of color channels for the spot colors to a number of color channels for the process colors is at least 0.5:1.

Embodiment 8: An embodiment of any one of embodiments 1-7, wherein the provided channels for the spot colors comprise an additional spot color channel, wherein the additional spot color channel does not correspond to one of the non-selected process colors of the known process ink color set.

Embodiment 9: An embodiment of any one of embodiments 1-8, wherein at least two spot colors correspond to at least two non-selected process colors of the known process ink color set.

Embodiment 10: An embodiment of embodiment 9, wherein the at least two spot colors are spot yellow and spot black.

Embodiment 11: An embodiment of any one of embodiments 1-10, further comprising applying one or more ink limits and one or more linearizations to the color channels comprising the selected process colors.

Embodiment 12: A process for printing an image comprising: identifying a known process ink color set comprising at least four colors; selecting two or more process colors from the known process ink color set; substituting each of the selected process colors with a spot color corresponding to the selected process color from the known process ink color set; providing a color channel for each unselected process color and each spot color; determining if the spot color is operating as the selected process color or the spot color; and printing an image on a substrate; wherein the color channel for the spot color is applied with a first ink limit and a first linearization corresponding to the selected process color; wherein the color channel for the spot color is applied with a second ink limit and a second linearization corresponding to the spot color.

Embodiment 13: An embodiment of embodiment 12, wherein the color channel for the spot color is configured to operate as the selected process color when the first ink limit and the first linearization are applied.

Embodiment 14: An embodiment of embodiment 12, wherein the color channel for the spot color is configured to operate as the spot color when the second ink limit and the second linearization are applied.

Embodiment 15: An embodiment of any one of embodiments 12-14, further comprising applying an ink limit and a linearization to the channel comprising the unselected process colors.

Embodiment 16: An embodiment of any one of embodiments 12-15, wherein the ratio of a number of substituted spot color channels to a number of process color channels is at least 0.5:1.

Embodiment 17: An embodiment of any one of embodiments 12-16, further comprising providing one or more color channels for additional spot colors, wherein the additional spot colors do not substitute process colors from the known process ink color set.

Embodiment 18: An embodiment of any one of embodiments 12-17, wherein the printing step comprises printing the image using at least one unselected process color and at least one spot color.

Embodiment 19: A process for printing from an inkjet printer comprising: providing one or more color channels comprising process colors selected from a known process ink color set; providing one or more color channels comprising spot colors, wherein one or more of the spot colors correspond to a non-selected process color of the known process ink color set; applying one or more ink limits to the one or more spot color channels; applying one or more linearizations to the one more spot color channels; and printing an image to a substrate; wherein the ratio of the number of channels comprising spot colors to the number of channels comprising process colors is at least 1:1.

Embodiment 20: An embodiment of embodiment 19, wherein a first ink limit and a first linearization are applied to the one or more spot color channels to produce a non-selected process color from the known process ink color set.

Embodiment 21: An embodiment of any one of embodiments 19-20, wherein a second ink limit and a second linearization are applied to the one or more spot color channels to produce a spot color.

Embodiment 22: An embodiment of any one of embodiments 19-21, wherein the printer comprises at least three color channels and two or fewer of the channels comprise process colors.

Embodiment 23: An embodiment of any one of embodiments 19-22, wherein the printer comprises at least six channels and wherein three or fewer of the channels comprise a process color and two or more of the channels comprise spot colors.

Embodiment 24: An embodiment of any one of embodiments 19-23, further comprising applying one or more ink limits and one or more linearizations to the color channels comprising the selected process colors.

Embodiment 25: An embodiment of any one of embodiments 19-24, further comprising providing one or more additional spot color channels, wherein the additional spot color channels do not correspond to one of the non-selected process colors of the known process ink color set.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

I claim:

1. A process for printing comprising:
   selecting eight or fewer process colors from a known process ink color set;
   providing eight or fewer color channels comprising the selected process colors from the known process ink color set;
   providing two or more color channels comprising spot colors, wherein one or more of the spot colors correspond to a non-selected process color of the known process ink color set;
   applying two or more ink limits to each color channel comprising the one or more spot colors;
   applying two or more linearizations to each color channel comprising the one or more spot colors; and
   printing an image.

2. The process of claim 1, wherein each color channel comprising the one or more spot colors is configured to operate as the spot color or the non-selected process color of the known process ink color set according to the applied ink limit and the applied linearization.

3. The process of claim 1, wherein a first ink limit and a first linearization are applied to each color channel comprising the one or more spot colors to produce a color set including the non-selected process color of the known process ink color set.

4. The process of claim 1, wherein a second ink limit and a second linearization are applied to each color channel comprising the one or more spot colors to produce a color set including the spot color.

5. The process of claim 1, wherein a ratio of a number of color channels for the spot colors to a number of color channels for the process colors is at least 0.5:1.

6. The process of claim 1, wherein the provided channels for the spot colors comprises an additional spot color channel, wherein the additional spot color channel does not correspond to one of the non-selected process color of the known process ink color set.

7. The process of claim 1, wherein at least two spot colors correspond to at least two non-selected process colors of the known process ink color set.

8. The process of claim 7, wherein the at least two spot colors are spot yellow and spot black.

9. The process of claim 1, further comprising applying one or more ink limits and one or more linearizations to the color channels comprising the selected process colors.

\* \* \* \* \*